United States Patent
Huntzicker et al.

(10) Patent No.: US 10,366,554 B2
(45) Date of Patent: Jul. 30, 2019

(54) SYSTEMS AND METHODS FOR SECURING A VEHICLE DURING EXTENDED IDLE

(71) Applicant: GM GLOBAL TECHNOLOGY OPERATIONS LLC, Detroit, MI (US)

(72) Inventors: Fred W. Huntzicker, Ann Arbor, MI (US); Pratyush Kumar, Troy, MI (US); David T. Proefke, Troy, MI (US); William A. Biondo, Beverly Hill, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 198 days.

(21) Appl. No.: 15/630,603

(22) Filed: Jun. 22, 2017

(65) Prior Publication Data

US 2018/0374289 A1 Dec. 27, 2018

(51) Int. Cl.
*G07C 9/00* (2006.01)
*B60R 25/20* (2013.01)
*B60R 25/042* (2013.01)

(52) U.S. Cl.
CPC ........ *G07C 9/00182* (2013.01); *B60R 25/042* (2013.01); *B60R 25/209* (2013.01)

(58) Field of Classification Search
CPC .. G07C 9/00182; B60R 25/209; B60R 25/042
See application file for complete search history.

(56) References Cited

U.S. PATENT DOCUMENTS

| | | | | |
|---|---|---|---|---|
| 6,865,451 B2* | 3/2005 | Onoyama | ............... | B60R 25/00 123/179.2 |
| 7,305,294 B2* | 12/2007 | Bate | ........................ | B60R 25/04 303/122.04 |
| 8,838,325 B2* | 9/2014 | Tomik | ..................... | B60K 28/04 340/438 |
| 9,132,805 B1* | 9/2015 | King | ........................ | B60R 25/04 |
| 2018/0265088 A1* | 9/2018 | Cikalo | ................. | B60W 10/06 |

* cited by examiner

*Primary Examiner* — Faye M Fleming
(74) *Attorney, Agent, or Firm* — Lorenz & Kopf, LLP

(57) ABSTRACT

Methods and systems are provided for an extended secure idle (SI) for a mobile platform. The SI may be entered and exited responsive to a variety of SI entry and SI exit conditions. SI entry and exit conditions include receiving key fob data from a key fob authenticated with the mobile platform. In addition, various predetermined safeguard conditions for scenarios to monitor may be designated a priori. The described system and method will continually check that the predetermined safeguard conditions are not violated during an extended SI.

3 Claims, 4 Drawing Sheets

SYSTEMS AND METHODS FOR SECURING A VEHICLE DURING EXTENDED IDLE

TECHNICAL FIELD

The technical field generally relates to mobile platform security systems, and more particularly relates to systems and related operating methods for securing a vehicle during an extended idle.

BACKGROUND

Mobile platforms, such as vehicles, generally require an engine to be running to sustain operation of onboard systems such as the heating, ventilation, and air conditioning system (HVAC). Putting the vehicle's transmission into park while the engine is running is generally referred to as idling. There are various scenarios in which a user may desire to exit a vehicle for an extended amount of time while it is idling; this is referred to as an extended idle. Scenarios include; when perishables are in the vehicle and when law enforcement canines are in the vehicle. However, without multiple keys, it may be difficult to secure the vehicle in an extended idle. Further, even with multiple keys, it may be desirable for a vehicle in an extended idle to perform various safeguard checks as the extended idle progresses to increase confidence that the vehicle is secure during the extended idle.

Accordingly, systems and related operating methods for a secure extended idle (SI) are desirable. The desirable systems and methods support a variety of predetermined SI entry and predetermined SI exit conditions, and may check safeguard conditions during SI. Furthermore, other desirable features and characteristics of the present disclosure will be apparent from the subsequent detailed description and the appended claims, taken in conjunction with the accompanying drawings and the foregoing technical field and background.

SUMMARY

This summary is provided to introduce a selection of concepts in a simplified form that are further described below in the detailed description section. This summary is not intended to identify key features or essential features of the claimed subject matter, nor is it intended to be used as an aid in determining the scope of the claimed subject matter.

A control module for a secure idle (SI) in a vehicle is provided. The control module comprising: a memory device comprising SI entry conditions and SI exit conditions; and a processor coupled to the memory device and configured to, determine that concurrently (i) the vehicle has an active powertrain, and (ii) the vehicle is parked; process a received first key fob data received from a key fob, the key fob data comprising SI entry conditions to determine that a SI entry condition is met; begin inhibiting vehicle mobility responsive to determining that the SI entry condition is met; and subsequent to beginning inhibiting vehicle mobility, cease inhibiting vehicle mobility upon determining that a SI exit condition is met.

A method for a secure idle (SI) in a vehicle is also provided. The method comprising: initializing SI entry conditions and SI exit conditions in a memory device; determining that both conditions are met (i) the vehicle has an active powertrain, and (ii) the vehicle is parked; processing a first key fob data with SI entry conditions to determine that an SI entry condition is are met, the first key fob data being received from a key fob; beginning inhibiting of vehicle mobility responsive to determining that the SI entry condition is met, wherein inhibiting mobility of the vehicle comprises locking the powertrain; and subsequent to beginning inhibiting vehicle mobility, ceasing the inhibiting of vehicle mobility upon determining that an SI exit condition is met.

A vehicle is provided. The vehicle comprising: a powertrain; a sensor system coupled to the powertrain; and a control module for a secure idle (SI) coupled to the sensor system and the powertrain, the control module comprising: a memory device comprising SI entry conditions and SI exit conditions; and a processor coupled to the memory device and configured to, upon determining that the powertrain is active and the vehicle is parked, process a received data with the SI entry conditions to determine that an SI entry condition is met; responsive to determining that the SI entry condition is met, begin inhibiting vehicle mobility, and command a display device to indicate that the vehicle is in a SI; and subsequent to beginning inhibiting vehicle mobility, cease inhibiting vehicle mobility upon determining that an SI exit condition is met.

BRIEF DESCRIPTION OF THE DRAWINGS

The present application will hereinafter be described in conjunction with the following drawing figures, wherein like numerals denote like elements, and.

DETAILED DESCRIPTION

Figure 1:
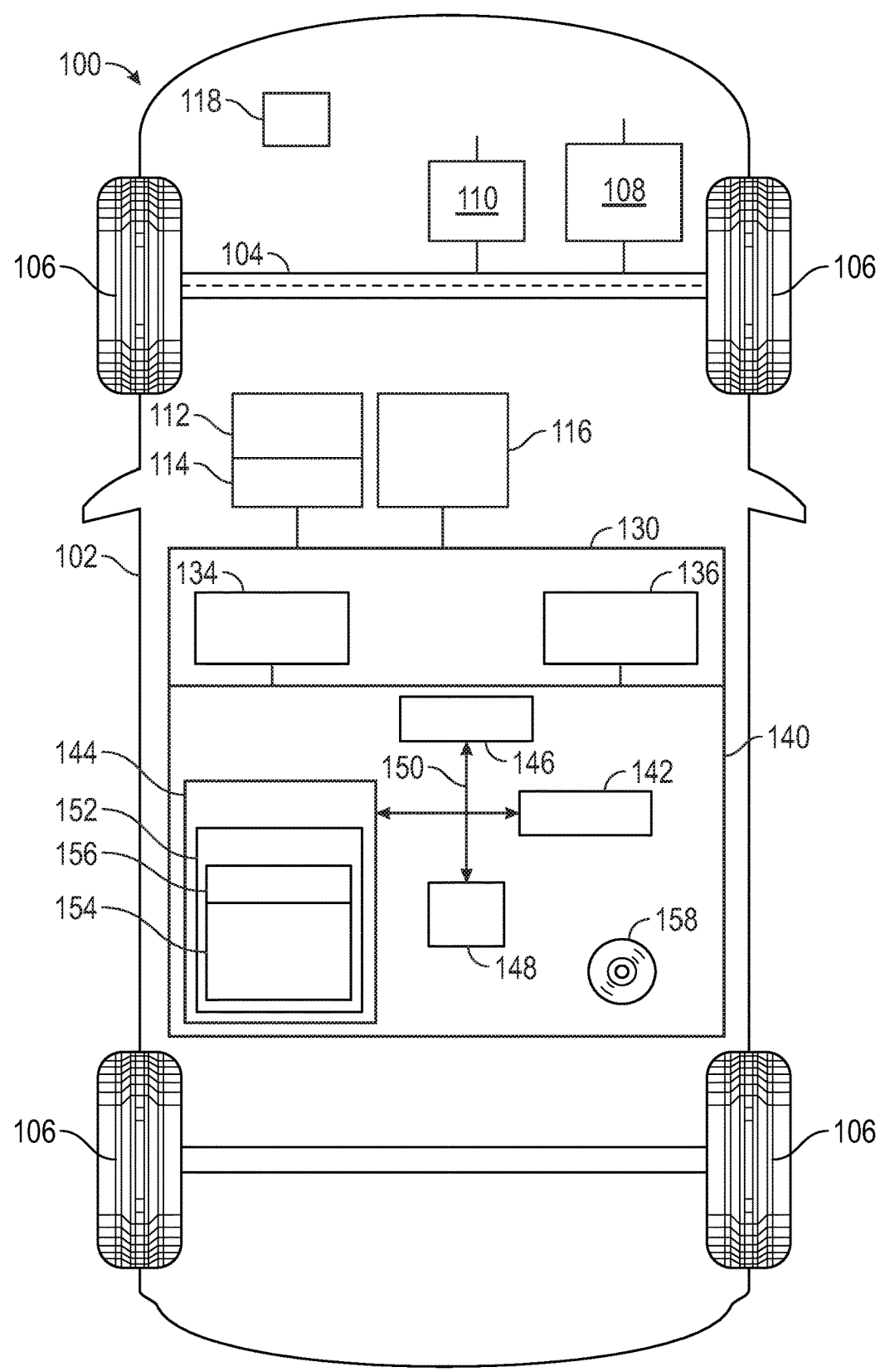
FIG. 1 is a functional block diagram illustrating a vehicle comprising a system for a secure idle (SI), in accordance with various exemplary embodiments.

The following detailed description is merely exemplary in nature and is not intended to limit the application and uses. Furthermore, there is no intention to be bound by any expressed or implied theory presented in the preceding technical field, background, brief summary or the following detailed description.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The provided system and method for securing a vehicle during an extended idle may take the form of a control module integrated within a preexisting mobile platform management system or vehicle control system.

It should be appreciated that the various block components techniques and technologies described herein and with reference to symbolic representations of operations, processing tasks, and functions that may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Such operations, tasks, and functions are sometimes referred to as being computer-executed, computerized, software-implemented, or computer-implemented.

As used herein, the word "exemplary" means "serving as an example, instance, or illustration." Any implementation described herein as exemplary, or as an exemplary embodiment, is not necessarily to be construed as preferred or advantageous over any other implementations. In addition, certain terminology may be used in the following description for the purpose of reference only, and thus are not intended to be limiting.

The following descriptions may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter.

For the sake of brevity, conventional techniques related to transmitting and receiving signals, wireless communication modules, wireless transceivers, network interfaces, and other functional aspects of certain systems and subsystems (and the individual operating components thereof) may not be described in detail herein. Accordingly, the examples presented herein are intended as non-limiting.

Turning now to FIG. 1, a functional block diagram of a vehicle 100 is depicted, in accordance with an exemplary embodiment. The vehicle 100 includes a body 102 that is arranged on a chassis 104. The body 102 substantially encloses the systems and components of the vehicle 100. The body 102 and the chassis 104 may jointly form a frame. The vehicle 100 also includes a plurality of wheels 106. The wheels 106 are each rotationally coupled to the chassis 104 near a respective corner of the body 102 to facilitate movement of the vehicle 100. Although the depicted embodiment realizes the mobile platform as a vehicle 100 with four wheels 106, the concepts presented here can be deployed in other mobile platforms with varying numbers of wheels 106, such as aircraft, spacecraft, watercraft, motorcycles, robots, robotic devices, and the like.

A control system 130 is enclosed within the body 102. It is readily appreciated that the control system 130 controls the general operation of the vehicle 100 and performs a variety of vehicle control functions that are beyond the scope of the present disclosure. In doing so, the control system 130, via a processor 142, loads and executes one or more programs, algorithms and rules embodied as instructions and applications 152 contained within the memory device 144. With respect to the present disclosure, the control system 130 is in operable communication with, and may provide centralized control for, the powertrain 108, the electronic power steering system (EPS) 110, the user input device 112, the display device 114, the navigation system 116, and a key fob 118 that is associated with the vehicle 100. The key fob 118 is shown within the body of the vehicle 100, but, as is readily appreciated, the key fob 118 may also be external to the vehicle 100. The operations of these functional blocks are described in more detail below.

The powertrain 108 is a propulsion system mounted on the chassis 104, and comprises a drive train for driving the wheels 106. In various exemplary embodiments, the powertrain 108 comprises an internal combustion engine and/or an electric motor/generator (referred to herein as simply an "engine"), coupled with the drive train and a transmission thereof. In certain embodiments, the powertrain 108 may vary, and/or two or more powertrains 108 may be used. The powertrain 108 may provide all-wheel-drive (AWD), rear-wheel-drive (RWD), or front-wheel-drive (FWD). By way of example, the engine in the powertrain 108 may include any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor, and may further be associated with a manual or automatic transmission. As used herein, the following phrases are interchangeable: (i) the powertrain 108 is "active," (ii) the vehicle 100 is running, (iii) the engine is running, and (iv) the propulsion system is active.

The EPS 110 comprises the components and sub-systems to collectively operate as what a user experiences as electric power steering for the vehicle 100. In various embodiments, the EPS 110 comprises a control unit, a steering wheel for receiving user steering input, and the mechanical components that are utilized to apply turning forces on the wheels.

The user input device 112 may be any one, or combination, of various known user input device devices including, but not limited to, a touch sensitive screen, a cursor control device (CCD) (not shown), such as a mouse, a trackball, or joystick, and/or a keyboard, one or more buttons, switches, or knobs. The display device 114 may be implemented using any one of numerous known display devices suitable for rendering textual, graphic, and/or iconic information in a format viewable by a user. As such, the display device 114 and the user input device 112 may be part of, or integrated with, the infotainment or navigation system 116, and may be employed to load programs and/or parameters into a memory device, as described below. Non-limiting examples of such display devices include cathode ray tube (CRT) displays, and flat panel displays such as LCD (liquid crystal displays) and TFT (thin film transistor) displays. In various embodiments, the display device 114 may include LED indicator lights or similarly functioning devices to provide visual alerts responsive to the control system 130.

The navigation system 116 includes sensors, devices, instruments (such as radar, Lidar, one or more cameras, and a global positioning system (GPS)), and software, sufficient for detecting and providing vehicle position, location, velocity, and orientation. Therefore, navigation data comprises vehicle position, location, velocity, and orientation data. In various embodiments, the navigation system 116 may be integrated with the display device 114 and user input device 112. In other embodiments, the navigation system 116 is integrated within the sensor system 134.

The key fob 118 may have one or more buttons or means for a user to enter a user request or command associated with the vehicle 100, for example, in various embodiments, the key fob 118 has a remote start button. The key fob 118 further has a means for transmitting the user request, in a usable format, to a control module 140 within the vehicle. Accordingly, in various embodiments, the key fob 118 may comprise a processor, a memory device, and one or more transceivers, for wireless communication with the control module 140 described below. Data and commands received from the key fob 118 are referred to as key fob data. In addition to sending active user input, the key fob may passively communicate (without direct user input) with the control module 140. It is readily appreciated that some type of authorization protocol may be utilized to confirm or authenticate secure wireless communication between the key fob 118 and the control module 140, although the details of such are outside the scope of the present disclosure. Beneficially, the provided systems and methods for secure idle (SI) operate responsive to key fob data received from an existing authorized key fob 118 that is associated with the vehicle 100, therefore not requiring the addition of new, specially located, and/or additionally priced user input and/or authorization devices.

In the embodiment depicted in FIG. 1, the control system 130 includes a sensor system 134, a transceiver 136, and a control module for extended SI operation ("control module") 140. The functions of these are each described below.

The sensor system 134 of the vehicle 100 generally includes a plurality of sensors, devices, and software, sufficient for sensing information, converting the sensed information into digital information, and providing the digital information, generally, as vehicle status data, and in particular, as sensor data, to the control system 130. Each sensor of the sensor system 134 may be specifically coupled to a component or subsystem of the vehicle 100 and configured to sense a specific aspect of the component or subsystem. As mentioned, the sensor system 134 and the navigation system 116 may be integrated. Sensor data may, therefore, comprise the navigation data described above.

The transceiver 136 may include at least one receiver and at least one transmitter that are operatively coupled to the processor 142. The transceiver 136 can enable the control module 140 to establish and maintain the communications links to the key fob 118, onboard components and external communication sources, including wired and wireless communication. The transceiver 136 can perform signal processing (e.g., digitizing, data encoding, modulation, etc.) as is known in the art. In some embodiments, the transceiver 136 is integrated with the control module 140. With respect to the present disclosure, the transceiver 136 may be the component of a vehicle control system 130 that initially receives key fob data and performs any required signal processing of the key fob data required to prepare it for use by control module 140.

Within the control system 130, the control module 140 executes a program 156 to secure the vehicle 100 during a SI. With continued reference to FIG. 1, the components of the control module 140 and their functions are described. In the depicted embodiment, the control module 140 includes a processor 142 (referenced above) that is communicatively coupled to a memory device 144, an interface 146, a database 148, a bus 150, and an optional storage disk 158. The control module 140 processes received inputs and performs tasks to generate commands, controls, and flags, as described herein.

Figure 2:
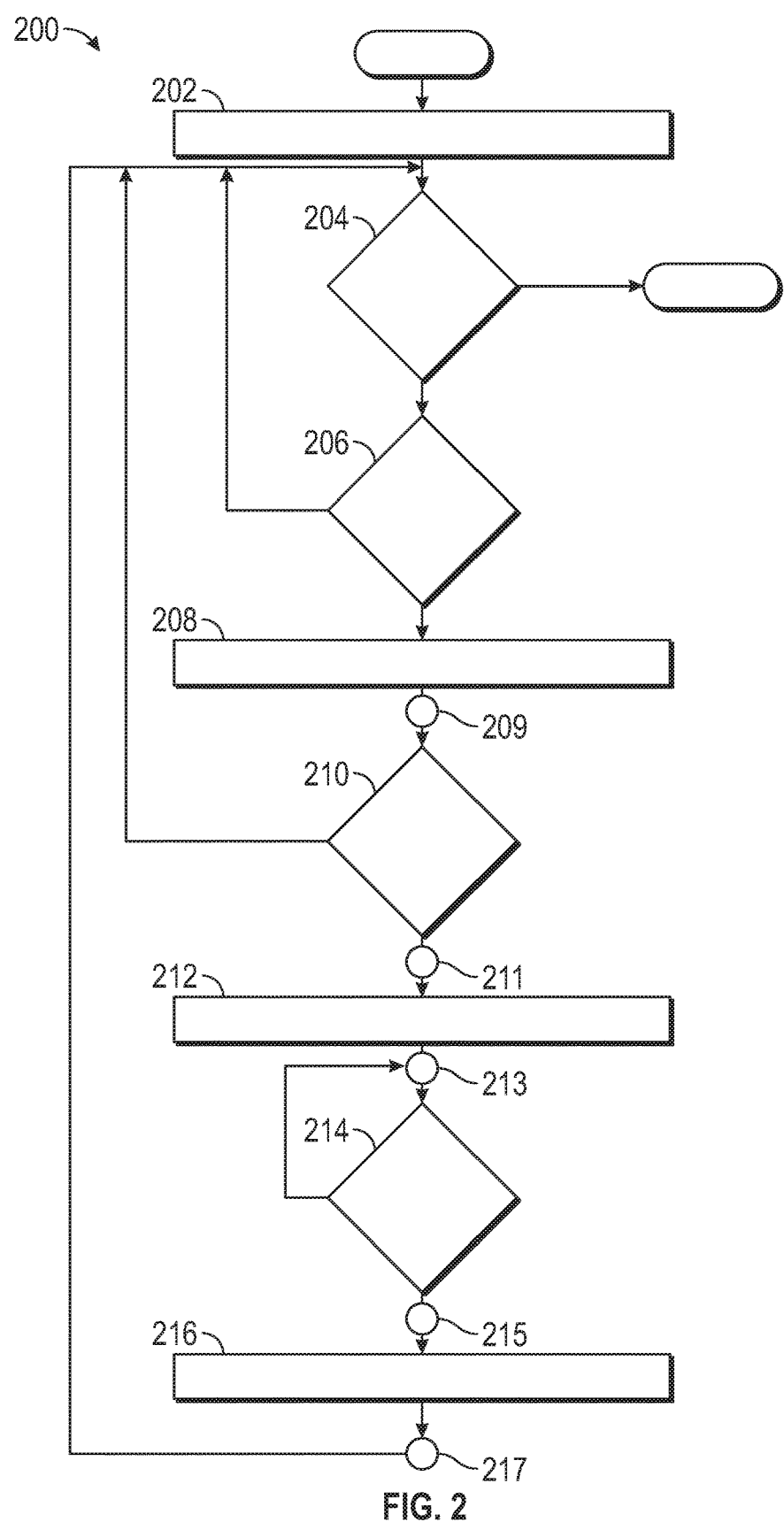
FIG. 2 is a flow chart describing a method for a secure idle (SI), in accordance with various exemplary embodiments.

In various embodiments, it is the processor 142 that loads and executes program 156, to thereby perform the computation and control functions attributed to the control module 140 and to the corresponding method 200 (FIG. 2). The processor 142 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals. In other embodiments, the control module 140 may be implemented in any combination of software or firmware, and program 156 may comprise program code segments distributed throughout that software or firmware. In various embodiments, the control module 140 may be coupled to or may otherwise utilize one or more remote computer systems and/or external (to vehicle 100) control systems.

A computer readable storage medium may be utilized as both storage and a scratch pad. In the exemplary embodiment, the memory device 144, the database 148, and the disk 158 represent computer readable storage media used for these functions. Within the computer readable storage medium, the memory locations where data bits are maintained are physical locations that have particular electrical, magnetic, optical, or organic properties corresponding to the data bits. The memory device 144 can be any type of suitable computer readable storage medium. For example, the memory device 144 may include various types of dynamic random access memory (DRAM) such as SDRAM, the various types of static RAM (SRAM), and the various types of non-volatile memory (PROM, EPROM, and flash). In certain examples, the memory device 144 is located on and/or co-located on the same computer chip as the processor 142. In the depicted embodiment, the memory device 144 stores the above-referenced instructions and applications 152 along with one or more configurable variables in stored values 154.

The database 148 and disk 158 comprise any suitable type of storage apparatus, including direct access storage devices such as hard disk drives, flash systems, floppy disk drives and optical disk drives. In one exemplary embodiment, the database 148 comprises a program product from which memory device 144 can receive a program 156 that executes one or more embodiments of one or more processes of the present disclosure, such as the steps of the method 200 (and any sub-processes thereof). In another exemplary embodiment, the program 156 may be uploaded through the transceiver 136, uploaded via a user input device 112, directly stored in and/or otherwise accessed by the memory device 144 and/or a disk (e.g., disk 158), such as that referenced below.

In addition to relevant program products, timers of variable predetermined size may be stored in the memory device 144. Parameters used in calculations and processing may be stored in stored values 154. Non-limiting examples of configurable parameters used in calculations and processing include: a first delay time, a second delay time, and parameters utilized in configuring predetermined secure idle (SI) entry conditions, and predetermined SI exit conditions.

SI entry conditions and SI exit conditions may take various forms. First, there are those that are authorized. Non-limiting examples of authorized SI entry conditions and authorized SI exit conditions include: detecting that a specific button, such as the remote start button, on the key fob 118, is pressed down and held down for a designated amount of time, detecting that several buttons on the key fob 118 have been pressed in a certain sequence, detecting a signal from a switch or other user input feature on a console within the vehicle in the presence of a passively communicating (without direct user input) key fob 118, and detecting a voice command or gesture in the presence of a passively communicating key fob 118. Next, SI entry conditions may comprise an unattended SI entry request, having one or more different conditions that must be satisfied. SI may be exited upon the detected occurrence of a violation of one or more safeguard conditions in the presence of a passively communicating key fob 118; safeguard conditions comprise: a low fuel level, a shift of the transmission out of park, an increase in an engine speed, an increase in a throttle position, and an indication that vehicle exterior locks have been tampered with. Additionally, SI may be exited responsive to an authorized user request, via the key fob 118 or the user input device 112. The use of various configurable parameters is described in more detail in connection with the method 200 and FIGS. 2-4.

The bus 150 serves to transmit programs, data, status and other information or signals between the various components of the computer system of the control module 140. The bus 150 can be any suitable physical or logical means of connecting computer systems and components. This includes, but is not limited to, direct hard-wired connections, fiber optics, infrared and wireless bus technologies.

The interface 146 enables communication between control module 140 and systems external to the control module 140, for example from a system driver and/or another computer system (not shown), and can be implemented using any suitable method and apparatus. In one embodiment, the interface 146 obtains the various data from the navigation system 116, the sensors of the sensor system 134 and/or the transceiver 136. The interface 146 can include one or more network interfaces to communicate with external systems or components, technicians, and/or storage apparatuses.

It will be appreciated that the control system 130 may differ from the embodiment depicted in FIG. 1. As a first example, in various embodiments, any combination of the user input device 112, the display device 114, and the navigation system 116 can be part of an existing console or user interface associated with the vehicle 100, and may be integrated to accept user input (for example, as manipulated buttons, speech, or touch screen interaction).

Referring now to FIG. 2 and with continued reference to FIG. 1, a flow chart is provided for a method 200 for a secure idle (SI) in a vehicle, in accordance with various exemplary embodiments. Method 200 represents various embodiments of a method associated with the control module 140. For illustrative purposes, the following description of method 200 may refer to elements mentioned above in connection with FIG. 1. In practice, portions of method 200 may be performed by different components of the described system. It should be appreciated that method 200 may include any number of additional or alternative tasks, the tasks shown in FIG. 2 need not be performed in the illustrated order, and method 200 may be incorporated into a more comprehensive procedure or method having additional functionality not described in detail herein. Moreover, one or more of the tasks shown in FIG. 2 could be omitted from an embodiment of the method 200 as long as the intended overall functionality remains intact.

The method starts, and initialization is performed at 202. Initialization may comprise uploading or updating instructions and applications 152, program 156, stored values 154, and any additional lookup tables or rules stored in the database 148. At initialization, the predetermined SI entry conditions and the predetermined SI exit conditions described above may be loaded into the memory 144. Initialization may also comprise designating space in the memory device 144 for one or more flags, a first timer, and a second timer; wherein the first timer is later utilized to determine when a first delay time has elapsed, and the second timer is later utilized to determine when a second delay time has elapsed.

At 204, the method determines that the vehicle 100 has an active powertrain 108. At 206, the method determines that the vehicle 100 is parked, which indicates that a transmission in the powertrain 108 is not in a driving gear. When the vehicle 100 does not have an active powertrain 108 and is parked, the vehicle 100 is determined to be in an idle. At 208, the method resets any timers and flags used by the control module 140. As mentioned, a first timer, timer 1, may be employed to allow a first delay time to elapse, and a second timer, timer 2, may be employed to allow a second delay time to elapse. One or more flags may be employed, for example, a first flag may be used as a flag to indicate that an authorized secure idle is in progress, and a second flag may be used to indicate that a violation of a safeguard condition has occurred. The timers, flags, and safeguards are described in more detail below.

At 210, the method 200 determines that SI entry conditions have been met. As mentioned above, SI may be entered upon selectively meeting an SI entry condition among a plurality of different SI entry conditions stored in the memory device 144. In making the determination that SI entry conditions are met, the processor 142 may process key fob data from an authorized key fob 118, the SI entry conditions stored in the memory device 144, and signals or status of one or more vehicle systems or sensors provided in sensor data from the sensor system 134. In an embodiment, the authorized SI entry request is considered to be sourced from the key fob 118. In another embodiment, the authorized SI entry request is considered to be sourced from a user input device 112 on or within the vehicle 100. For details regarding the determination that the SI entry conditions are met, refer to FIG. 3, which provides an expansion of 210, from "A" 209 to "B" 211. At 212, the method 200 begins to inhibit mobility of the vehicle. In conjunction with beginning to inhibiting mobility, the control module 140 may command the display device 114 to display an alphanumeric message or symbol, and/or illuminate an LED or similar indicator indicating that the vehicle 100 is in SI. Inhibiting mobility comprises locking the powertrain 108, and may additionally comprise locking external door locks, and locking features of the EPS 110. Locking, as used herein, means preventing or limiting unauthorized usage. Conventionally, "locking" means a physical disabling of a feature, such as the latch of the door. As used herein, locking of the doors, powertrain 118, or EPS 110, may be done in software, such as is done by an e-latch, in which the latch of the door is actuated electrically to disable its use. The method 200 may continue to inhibit mobility and command the display device 114 to indicate that the vehicle 100 is in SI until an SI exit condition is met at 214.

Figure 4:
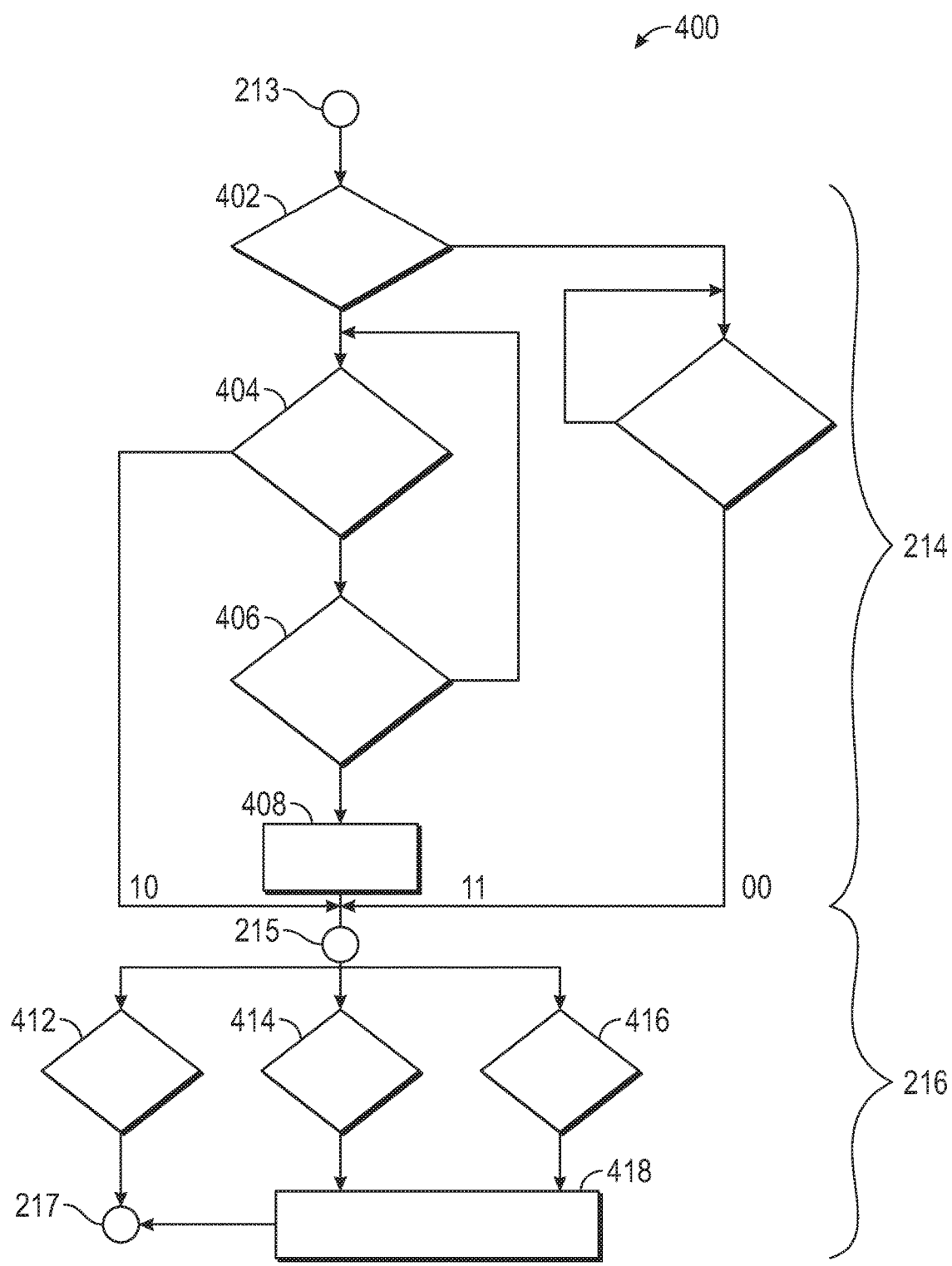
FIG. 4 is a flow chart providing more detail regarding exiting SI, in accordance with various exemplary embodiments.

Similar to SI entry conditions, in making the determination that SI exit conditions are met, the processor 142 may process key fob data from an authorized key fob 118, the initialized SI exit conditions stored in the memory device, and signals or status of one or more vehicle 100 systems or sensors provided in sensor data from the sensor system 134. In an embodiment, an authorized SI exit request is considered to be sourced from the key fob 118. In another embodiment, the authorized SI exit request is considered to be sourced from a user input device 112 on or within the vehicle 100. For details regarding the determination that the SI exit conditions are met, refer to FIG. 4, which provides an expansion of 214, from "C" 213 to "D" 215. Responsive to determining that SI exit conditions are met, at 216, the method 200 ceases the inhibiting of mobility, thereby terminating the instance of secure idle (SI). Termination of SI comprises the ceasing of inhibiting mobility. As used herein, ceasing of inhibiting mobility comprises undoing any of: the locking of the doors, powertrain 118, or EPS 110, that had been done at 212. The method 200 may cease commanding the display device 114 to indicate that the vehicle 100 is in SI responsive to ceasing the inhibiting of mobility at 216. FIG. 4 provides more detail regarding tasks associated with ceasing the inhibiting of mobility at 216.

Figure 3:
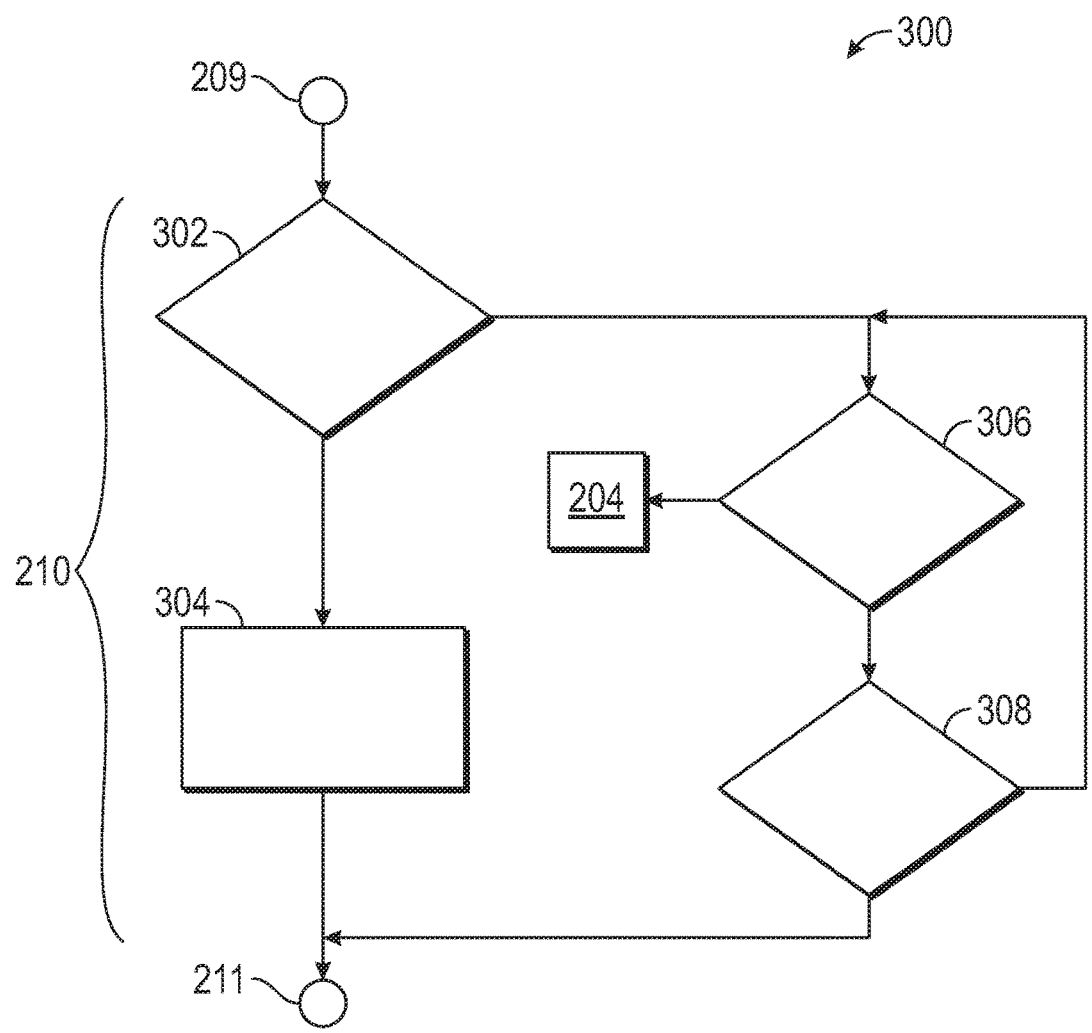
FIG. 3 is a flow chart providing more detail regarding entering SI, in accordance with various exemplary embodiments.

Turning now to FIG. 3, determining whether SI entry conditions have been met at 210 is described in more detail. As mentioned above, SI entry conditions may comprise an authorized SI entry request and/or an unattended SI entry request. At 302 an authorized SI entry request is detected, which means that it is received by the control module 140 and processed with the SI entry conditions and determined to be a valid authorized SI entry request. Responsive thereto, an "authorized SI" flag (first flag) may be asserted at 304. The SI entry conditions further comprise an "unattended SI entry condition," comprising (i) the key fob 118 is detected to be external to the vehicle (at 306), and (ii) an absence of the authorized SI entry request (at 302). An unattended SI entry request may be initiated when the vehicle operator has exited the vehicle 100 with the engine running (powertrain 108 active) and the doors unlocked for longer than anticipated. A first delay time is a configurable parameter that may be predefined to represent an amount of time that a person might reasonably be out of their vehicle 100 with the engine running before securing the vehicle 100 in SI. Accordingly, from 306, the control module 140 may utilize a first timer to allow the first delay time to elapse at 308 before determining that the SI entry conditions are met at "B" 211.

FIG. 4 is a flow chart 400 depicting details associated with determining that SI exit conditions are met at 214 and with ceasing the inhibiting of mobility at 216. As mentioned, SI may be entered by meeting an authorized SI entry condition or an unattended SI entry condition. SI exit conditions may vary depending upon the way that the SI was entered, and this is depicted in FIG. 4. In the course of operating, the control module 140 may employ various methods to distinguish between a SI that was entered with authorization versus a SI that was entered without authorization (the unattended entry). In various embodiments, the first flag may be used as an "authorized SI flag" for this purpose. At 402, the first flag is asserted, indicating that the SI was entered with an authorized SI entry condition, and at 404 the method 200 detects an authorized SI exit request. This implies that the SI exit conditions comprise an authorized SI exit request. In an embodiment, the authorized SI exit request is received as a second instance of key fob data. In another embodiment, similar to the authorized SI entry request described above, the authorized SI exit request may come from a user input device 112 in the presence of an authorized passively communicating key fob 118. In still another embodiment, the SI exit request comprises the vehicle being shifted into a driving gear in the presence of an authorized passively communicating key fob 118.

While the vehicle is operating in SI, there may be various scenarios for which it is desirable to stop the vehicle's engine from further operation, i.e., deactivate the powertrain 108. In practice, these may include violating safeguard conditions in the presence of a passively communicating key fob, described above, such as, a minimum threshold of remaining fuel, detecting or sensing that someone is tampering with door locks or windows, unauthorized shifting of the transmission, application of vehicle throttle controls, or unauthorized application of similar powertrain 108 effecting controls. Safeguard conditions may be predefined and stored in the memory device 144. During operation of the SI, the control module 140 may continuously receive and process signals from relevant vehicle systems, such as the sensor system 134, to monitor/check the vehicle 100 for status with respect to the safeguard conditions. In practice, the violation of a safeguard condition at 406 may be considered another SI exit condition, and responsive thereto, the control module 140 may command the powertrain 108 to shut down the vehicle's engine at 418 (i.e., deactivate the powertrain 108). In some embodiments, one or more flags may be employed and asserted to indicate that a safeguard condition has been violated before the instance of SI is terminated at 216. Although the monitoring or checking of the safeguard conditions at 406 is depicted in connection with a SI that was entered responsive to an authorized SI entry request, safeguard conditions may be monitored when the SI was entered responsive to an unattended SI entry condition.

In addition to shutting down the engine responsive to detecting a violation of a safeguard condition, if SI was entered via meeting unattended SI entry conditions, it may be desirable to shut down the engine if the owner has not returned and taken control of the vehicle 100 before a second delay time has elapsed at 410. Accordingly, another configurable parameter, the second delay time, may be used to represent an amount of time to let the vehicle idle in SI before the control module 140 may command the powertrain 108 to shut down the vehicle's engine. As mentioned, a variety of methods may be used to distinguish a SI entered via an authorized SI entry request from a SI entered responsive to meeting unattended SI entry conditions, and each may be exited responsive to different conditions. In various embodiments, a first flag (F1) and a second flag (F2) may be used for these purposes, as shown at 412, 414, and 416; depending upon the state of F1:F2, SI is terminated differently.

Accordingly, the described system and method provide a secure idle (SI) for a mobile platform that may be entered and exited responsive to a variety of SI entry and SI exit conditions. In addition, various predetermined safeguard conditions may be designated a priori, and the described system and method will continually check that they are not violated during an extended SI. The provided system and method may take the form of control module 140 integrated within a preexisting mobile platform or vehicle control system 130.

It will also be appreciated that while the depicted exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program 156 and containing computer instructions stored therein for causing a computer processor (such as the processor 142) to perform and execute the program 156. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments.

While at least one exemplary aspect has been presented in the foregoing detailed description of the invention, it should be appreciated that a vast number of variations exist. It should also be appreciated that the exemplary aspect or exemplary aspects are only examples, and are not intended to limit the scope, applicability, or configuration in any way. Rather, the foregoing detailed description will provide those skilled in the art with a convenient road map for implementing an exemplary aspect of the invention. It should be understood that various changes may be made in the function and arrangement of elements described in an exemplary aspect without departing from the scope as set forth in the appended claims.

What is claimed is:

1. A control module for a secure idle (SI) in a vehicle, the control module comprising:
   a memory device comprising SI entry conditions and SI exit conditions; and
   a processor coupled to the memory device and configured to,
      determine that concurrently (i) the vehicle has an active powertrain, and (ii) the vehicle is parked;
      process a received first key fob data received from a key fob command, the key fob data comprising SI entry conditions comprising an authorized SI entry request to determine that a SI entry condition is met;
      begin locking the powertrain on the vehicle responsive to determining that the SI entry condition is met; and
      subsequent to beginning locking the powertrain on the vehicle, cease locking the powertrain on the vehicle upon determining that a SI exit condition, comprising an authorized SI exit request received in second key fob data, is met;
   wherein the SI exit conditions further comprise a safeguard condition, the safeguard condition comprising one from the set including: a low fuel level, a shift of the transmission out of park, an increase in an engine speed, an increase in a throttle position, and an indication that vehicle exterior locks have been tampered with; and
   the processor is configured to, while inhibiting vehicle mobility:
      determine that the safeguard condition has been violated; and
      responsive to determining that the safeguard condition has been violated, deactivate the powertrain of the vehicle;
   command a display device to display, while locking the powertrain, an indication that the vehicle is in a SI; and
   command the display device to cease displaying the indication that the vehicle is in SI upon ceasing the locking of the powertrain;
the SI entry conditions further comprising an unattended SI entry request, comprising the conditions (i) the key fob is external to the vehicle, and (ii) an absence of the authorized SI entry request;
   the processor further configured to,
   allow a first delay time to elapse, subsequent to determining that the unattended SI entry request conditions are met; and
   determine that the SI entry condition is met after the elapse of the first delay time; and
   subsequent to beginning locking the powertrain, allow a second delay time to elapse, and cease operation of the powertrain of the vehicle after the elapse of the second delay time.

2. A method for a secure idle (SI) in a vehicle, the method comprising:
   initializing SI entry conditions and SI exit conditions in a memory device;
   determining that both conditions are met (i) the vehicle has an active powertrain, and (ii) the vehicle is parked;
   processing a first key fob data with SI entry conditions to determine that an SI entry condition is are met, the first key fob data being received from a key fob;
   beginning inhibiting of vehicle mobility responsive to determining that the SI entry condition is met, wherein inhibiting mobility of the vehicle comprises locking the powertrain;
   subsequent to beginning inhibiting vehicle mobility, ceasing the inhibiting of vehicle mobility upon determining that an SI exit condition is met;
   commanding a display device to display, while inhibiting vehicle mobility, an indication that the vehicle is in a SI;
   commanding the display device to cease displaying the indication that the vehicle is in SI upon ceasing inhibiting vehicle mobility;
   wherein the SI entry conditions comprise an authorized SI defined by an authorized SI entry request, and further comprising: (i) determining that SI entry conditions are met responsive to determining that the first key fob command comprises the authorized SI entry request, or (ii) detecting user actions in the presence of an authorized passively communicating key fob;
   wherein the SI exit conditions comprise an authorized SI exit request, and further comprising ceasing the inhibiting of vehicle mobility upon determining that (i) a received second key fob command comprises the authorized SI exit request, or (ii) detecting user actions in the presence of an authorized passively communicating key fob;
   wherein the SI exit conditions further comprise a safeguard condition, and further comprising deactivating the powertrain of the vehicle responsive to determining that the safeguard condition has been violated;
   wherein the safeguard condition comprises one from the set including: a low fuel level and an indication that vehicle exterior locks have been tampered with;
   wherein the SI entry conditions further comprise an unattended SI entry request, comprising the concurrent conditions (i) the key fob is external to the vehicle, and (ii) an absence of the authorized SI entry request; and
further comprising:
   allowing a first delay time to elapse, subsequent to determining that the conditions for the unattended SI entry request are met;
   determining that the SI entry conditions are met after the elapse of the first delay time;
   allowing a second delay time to elapse subsequent to determining that the SI entry conditions for the unattended SI are met;
   determining that the SI exit conditions are met responsive to the second delay time elapsing; and
   deactivating the powertrain of the vehicle responsive to determining that the SI exit conditions are met.

3. A method for a secure idle (SI) in a vehicle, the method comprising:
   determining that both conditions are concurrent (i) the vehicle has an active powertrain, and (ii) the vehicle is parked; and then
   beginning locking the powertrain responsive to determining that an SI entry condition is met based on a received first key fob command received from a key fob; and ceasing locking the powertrain responsive to (i) determining that an SI exit condition is met based on a received second key fob command, wherein the SI exit condition comprises an authorized SI exit request, or (ii) upon detecting user actions in the presence of an authorized passively communicating key fob; and further comprising:

allowing a first delay time to elapse, in response to detecting the concurrent conditions (i) the key fob is external to the vehicle, and (ii) an absence of an authorized SI entry request;

determining that an authorized SI entry request occurred after the elapse of the first delay time;

allowing a second delay time to elapse subsequent to detecting the concurrent conditions (i) the key fob is external to the vehicle, and (ii) an absence of the authorized SI entry request;

determining that the SI exit conditions are met and deactivating the powertrain of the vehicle after the elapse of the second delay time.

* * * * *